(No Model.)
2 Sheets—Sheet 1.
T. R. FERRALL.
ANTI FRICTIONAL BEARING.
No. 252,872.
Patented Jan. 31, 1882.
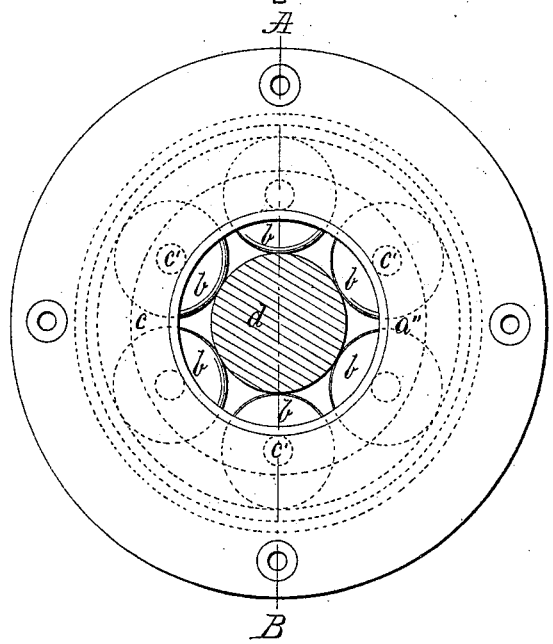
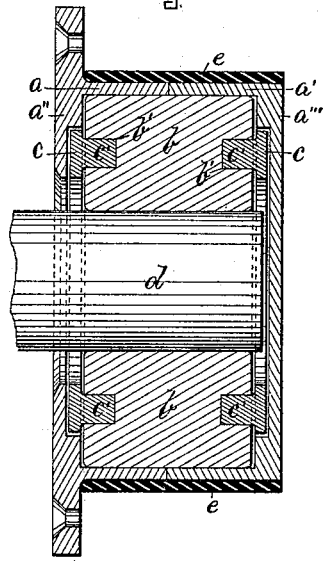
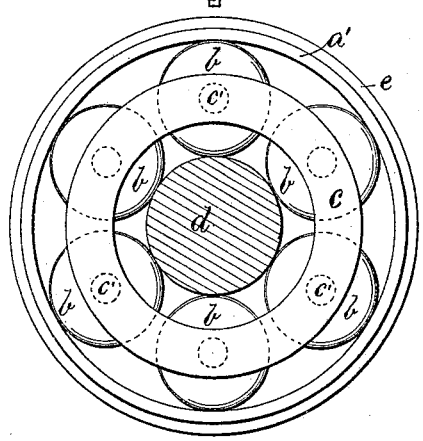
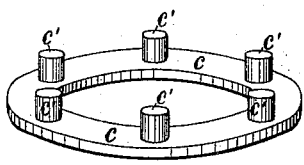
Witnesses.
Henry Chadbourn.
Sarah M. Goodrich
Inventor.
Thomas R. Ferrall
by Alban Andren
his att.

(No Model.) 2 Sheets—Sheet 2.

T. R. FERRALL.
ANTI FRICTIONAL BEARING.

No. 252,872. Patented Jan. 31, 1882.

Witnesses.
Henry Chadbourn.
Sarah M. Goodrich.

Inventor.
Thomas R. Ferrall
by Alban Andrew
his atty

UNITED STATES PATENT OFFICE.

THOMAS R. FERRALL, OF BOSTON, MASSACHUSETTS.

ANTI-FRICTIONAL BEARING.

SPECIFICATION forming part of Letters Patent No. 252,872, dated January 31, 1882.

Application filed December 3, 1881. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification and illustrated in the accompanying drawings.

This invention relates to improvements in anti-frictional bearings; and it is carried out as follows, reference being had to the accompanying drawings, on which—

Figure 5:
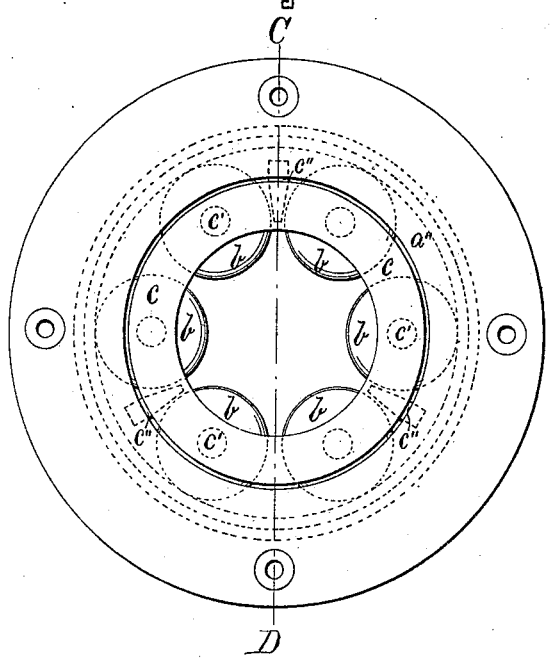
Figure 7:
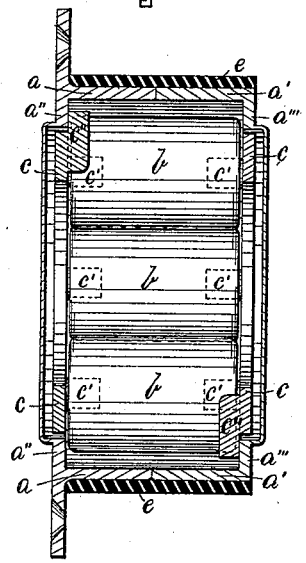
Figure 6:
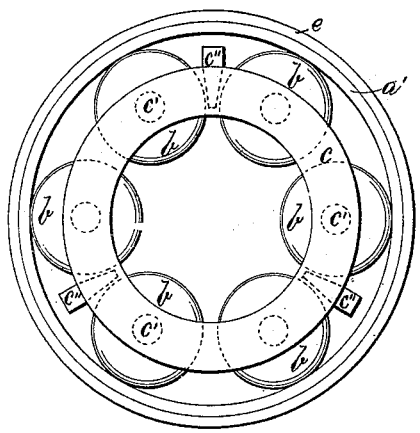
Figure 8:
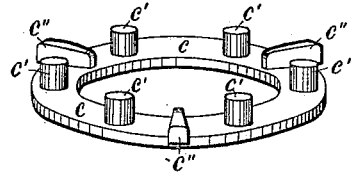

Figure 1 represents an end view of the bearing with bored-out ends ready for use. Fig. 2 represents an internal view of the same, showing the end as being removed. Fig. 3 represents a longitudinal section on the line A B, shown in Fig. 1, and showing one end of the cap solid before being bored out and the opposite end open after being bored out for the insertion of the shaft. Fig. 4 represents a perspective view of the regulator. Fig. 5 represents an end view of the bearing with bored-out ends. Fig. 6 represents an interior view of the bearing with its end cap shown as being removed. Fig. 7 represents a cross-section of the bearing on the line C D, shown in Fig. 5, showing, however, the end caps solid before being bored through for the insertion of the shaft; and Fig. 8 represents a perspective view of one of the regulators shown in Figs. 5, 6, and 7.

Similar letters refer to similar parts wherever they occur on the different parts of the drawings.

$a$ and $a'$ represent the caps or shells, within which the anti-frictional rollers $b$ $b$ $b$ are located. Each roller $b$ is provided in each of its ends with a cylindrical central recess, $b'$, into which each of the cylindrical projections $c'$ of the regulator $c$ is made to fit loosely. I use one regulator $c$ with its cylindrical projections $c'$ $c'$ for each end of the bearing, as shown in Figs. 3 and 7. The rollers $b$ $b$ $b$ are the only connecting devices used between the regulators $c$ $c$; and it will be seen that I dispense entirely with the usual stays or rivets for securing the regulators together at their proper distance apart, such rivets being objectionable on account of their heads projecting outside of the smooth part of the end of each regulator, and thereby causing frictional as well as wearing-out resistance, and when the heads of such stays or rivets become worn the rollers get loose from the regulators, and the anti-frictional bearing is useless. The regulators $c$ $c$ are kept from moving too far endwise in the direction of the shaft $d$ by the outer annular portion of the ends $a''$ $a'''$ of the shells $a$ $a'$, respectively, either by being made as shown in Figs. 3 and 4, where the outside of each regulator $c$ stops directly against the inside of one of the end caps, $a''$ $a'''$, or by providing each regulator with a suitable number of radial projections, $c''$ $c''$, (shown in Figs. 5, 6, 7, and 8,) located between two or more of the cylindrical projections $c'$ $c'$ and on the inside of each of said regulators, as shown in the said figures, the outer ends of which projections serve as stops against the inside of the respective end caps, $a''$ or $a'''$.

In making this my improved anti-frictional bearing, I cast the shell and cap $a$ $a''$ in one piece, and the shell $a'$ $a'''$ also in one single piece, their ends being made solid, as shown in Fig. 7 and in the right-hand side of Fig. 3. The rollers $b$ $b$ $b$ and regulators $c$ $c$ are then placed in the space bounded by the parts $a$ $a'$ $a''$ $a'''$, as shown in Figs. 3 and 7, after which molten metal $e$ is cast around the shells $a$ $a'$, as shown in said Figs. 3 and 7, by which arrangement the rollers $b$ $b$ and regulators $c$ $c$ are inclosed air-tight within said shells, which may now be galvanized or pickled without injury to the inclosed rollers $b$ $b$ and their regulators. After the aforesaid shells and end caps are properly finished and cleaned I remove the central portions of the said end caps, $a''$ $a'''$, by means of a boring or drilling tool for the reception of the axle $d$, as shown in the left-hand end of Fig. 3, by which means I dispense with the usual method of rattling the bearings within the usual rattling-drum, which latter method is objectionable on account of the wearing off of the roller-bearings by the sand and grit used in such rattling-drums.

By making the central parts of the end caps, $a''$ $a'''$, very thin and outwardly projecting, as shown in Fig. 7, such central parts may easily be removed after the outer case is galvanized or pickled, by making a single circular incision in each end by means of a suitable cutting-tool, the bearing being held and rotated in a suitable lathe-chuck during this operation.

What I wish to secure by Letters Patent, and claim, is—

1. In anti-frictional bearings, the shells $a\ a''\ a'\ a'''$ and the rollers $b\ b$, in combination with the regulators $c\ c$ and their radial intermediate projections, $c''\ c''\ c''$, adapted to serve as stops for the said regulators against the inside of the flanges $a''\ a'''$, as herein shown and described.

2. In anti-frictional bearings, the shells $a\ a''\ a'\ a'''$, the rollers $b\ b$, with their cylindrical recesses $b'\ b'$, the regulators $c\ c$, with cylindrical projections $c'\ c'$, and radial intermediate projections, $c''\ c''$, as and for the purpose set forth.

3. The herein-described method of making anti-frictional bearings, consisting in casting the shells $a\ a'$ with solid ends $a''\ a'''$, inserting therein the rollers and regulators, then casting around the abutting shells $a\ a'$ the metal ring $e$, and finally boring out or removing the central parts of the ends $a''\ a'''$, for the insertion and reception of the shaft $d$, as and for the purpose set forth.

In testimony whereof I have affixed my signature in presence of two witnesses.

THOMAS R. FERRALL.

Witnesses:
ALBAN ANDRÉN,
EDWARD O. LOUD.